(12) United States Patent
Nakamura et al.

(10) Patent No.: US 7,037,004 B2
(45) Date of Patent: May 2, 2006

(54) OPTICAL FIBER COMPONENT FOR SPOT SIZE TRANSITION AND METHOD OF MAKING THE SAME

(75) Inventors: Nahoko Nakamura, Kawasaki (JP); Keiko Shiraishi, Kawasaki (JP); Tomotaka Murase, Kawasaki (JP); Susumu Ohneda, Kawasaki (JP)

(73) Assignee: Showa Electric Wire & Cable Co., Ltd., Kawasaki (JP)

( * ) Notice: Subject to any disclaimer, the term of this patent is extended or adjusted under 35 U.S.C. 154(b) by 115 days.

(21) Appl. No.: 10/718,645

(22) Filed: Nov. 24, 2003

(65) Prior Publication Data

US 2004/0218867 A1   Nov. 4, 2004

(30) Foreign Application Priority Data

Dec. 24, 2002   (JP) .............................. 2002-372525

(51) Int. Cl.
*G02B 6/255* (2006.01)
*C03B 37/15* (2006.01)

(52) U.S. Cl. .............................. 385/96; 385/43; 385/76; 385/77; 385/95; 65/399; 65/406; 65/407

(58) Field of Classification Search .................. 385/31, 385/43, 42, 139, 76, 77, 78, 60, 95, 96, 97, 385/98, 99; 65/399, 406, 407
See application file for complete search history.

(56) References Cited

U.S. PATENT DOCUMENTS

| | | | | |
|---|---|---|---|---|
| 5,729,643 A * | 3/1998 | Hmelar et al. | ................. | 385/43 |
| 5,940,554 A | 8/1999 | Chang et al. | ................... | 385/22 |
| 6,324,326 B1 * | 11/2001 | Dejneka et al. | ............. | 385/123 |
| 6,594,419 B1 * | 7/2003 | Ukrainczyk et al. | .......... | 385/33 |
| 2001/0017971 A1* | 8/2001 | Iwata et al. | .................. | 385/139 |
| 2002/0034364 A1 | 3/2002 | Veng | ............................ | 385/96 |
| 2002/0057877 A1 | 5/2002 | Sasaoka | ........................ | 385/95 |
| 2003/0194485 A1 | 10/2003 | Tamura et al. | ................ | 385/39 |
| 2004/0218867 A1* | 11/2004 | Nakamura et al. | ............ | 385/43 |

FOREIGN PATENT DOCUMENTS

JP   08-190030   9/1999   ............... 385/95 X

* cited by examiner

*Primary Examiner*—Brian M. Healy
(74) *Attorney, Agent, or Firm*—Bacon & Thomas, PLLC

(57) ABSTRACT

A large-diameter core optical fiber and a small-diameter core high optical fiber are fusion-spliced, and the spliced portion is heated to expand the core diameter of a core of the high optical fiber and form a spot size transition portion, whereby spot sizes of the optical fibers are matched and relative refractive index differences thereof are made substantially identical. Subsequently, the optical fiber is cut at an arbitrary position and the spliced portion and the spot size transition portion are placed inside a ferule with the large diameter core optical fiber arranged on a light incident and outgoing end face side of the ferrule to form an optical fiber component. The core diameter is expanded while monitoring transition loss of the splined portion to obtain an optical fiber component having an optimal spot size transition portion without an advanced technique and without increase in transition loss.

12 Claims, 3 Drawing Sheets

(a)

(b)

(c)

OPTICAL FIBER COMPONENT FOR SPOT SIZE TRANSITION AND METHOD OF MAKING THE SAME

BACKGROUND OF THE INVENTION

1. Field of the Invention

The present invention relates to an optical fiber component for spot size transition and a method of making the same. In particular, the present invention relates to an optical fiber component for spot size transition formed by splicing optical fibers with different core diameters and a method of making the same.

2. Description of the Related Art

Optical fiber communication networks have been established rapidly in recent years. The optical fiber communication network is basically formed by splicing an outdoor optical fiber cable and an indoor apparatus or the like. In a situation in which demands for a communication network are increasing, high density packaging of optical fibers is inevitable. For example, in intra-machine wiring or the like, since the number of optical fibers inevitably increases, saving of space for containing the optical fibers and wiring of the optical fibers are matters of major concern.

In order to contain and wire a large number of optical fibers in a limited space, it is necessary to bend the optical fibers with a small radius of curvature. However, if the optical fibers are bent with a small radius of curvature, light easily leaks and the quality of the communication network as a whole is degraded.

Thus, in order to prevent light from easily leaking, even if the optical fibers are bent with a small radius of curvature, a so-called high $\Delta$ optical fiber has started to be used, in which a refractive index difference between a core and a clad, that is, a relative refractive index difference $\Delta$, is larger than that of a single mode (SM) fiber which is the conventional optical fiber used in communication networks. The relative refractive index difference $\Delta$ of the high $\Delta$ optical fiber is 0.5 to 2.5%, whereas the refractive index difference $\Delta$ of the SM fiber is about 0.3%. If the relative refractive index difference is increased in this way, since the core diameter decreases, the spot size also decreases. Here, the spot size is a parameter indicating spread of the electromagnetic field distribution, that is, field distribution of a propagation mode in an optical waveguide, and is also referred to as mode field diameter.

However, such a high $\Delta$ optical fiber is also eventually required to be spliced with the ordinary optical fiber which constitutes the optical fiber cable. As a result, a large transition loss is caused because mismatching occurs in a splice due to not only a difference between core diameters, but also a difference between spot sizes. For example, when the SM fiber and a high $\Delta$ optical fiber with a spot size, which is about half of that of the ordinary optical fiber, are spliced in an abutting state using a connector or the like, a large transition loss of about 2 dB occurs due to the difference in spot sizes.

In order to eliminate such mismatching in a spliced portion of a SM fiber and a high $\Delta$ optical fiber, the following two techniques are known. In one technique, after fusion-splicing the SM fiber and the high $\Delta$ optical fiber, the high $\Delta$ optical fiber is heated to thereby thermally diffuse a dopant in the fibers to expand the core diameter such that an optimal spot size is obtained. The other technique involves heating the high $\Delta$ optical fiber to thereby thermally diffuse a dopant in the fiber and expand the core diameter such that an optimal spot size is obtained and, then, cutting the part of the expanded core diameter to fusion-splice the high $\Delta$ optical fiber with the SM fiber (e.g., see Japanese Patent No. 2618500).

In addition, there is also known a technique which involves cutting the expanded part and mounting the high $\Delta$ optical fiber to an optical connector such that a cut face thereof becomes an light incident and outgoing end face (e.g., see Japanese Patent No. 2619130).

The above-mentioned conventional techniques have problems as described below.

Japanese Patent No. 2618500 and Japanese Patent No. 2619130 describe a technique involving expanding the core diameter of the high $\Delta$ optical fiber and, then, cutting the expanded part to splice the high $\Delta$ optical fiber with the SM fiber. However, in the case where the location of the cut is decided such that an optimal spot size is obtained, since a transition loss is confirmed after splicing the high $\Delta$ optical fiber and the SM fiber, it is difficult at the time of cutting to judge whether the cuffing location is always at a portion where the optimal spot size is obtained. Thus, a highly accurate cutting technique and experience are required.

In addition, in the case in which a core diameter is expanded by heating an optical fiber, the expanded core diameter may fluctuate depending upon heating conditions, and it is impossible to cut a large number of optical fibers always at the identical position when core diameters of the optical fibers are expanded. Thus, it is difficult to steadily optimizes spot sizes of a range number of optical fibers.

Moreover, in the case in which the high $\Delta$ optical fiber is connected to the optical connector with the core expanded portion as the incident and outgoing end face, since an advanced technique is required for grinding the incident and outgoing end face in order to obtain an optimal spot size, it is difficult to increase working efficiency. Thus, process management becomes complicated.

SUMMARY OF THE INVENTION

The present invention provides an optical fiber component, in which spot sizes of optical fibers with different core diameters are uniformly optimized, and a method of making the same.

In order to solve the above-mentioned problems, the, present invention provides an optical fiber component for changing spot seizes of optical fibers with different core diameters, the optical fiber component including: a large-diameter core optical fiber having a light incident and outgoing end face; a spliced portion in which the large-diameter core optical fiber and a small-diameter core optical fiber are fusion-spliced; a spot size transition portion in which a core diameter of the small-diameter core optical fiber is expanded in the vicinity of the spliced portion; and the small-diameter core optical fiber.

The refractive index profile in the spot size transition portion continuously changes along the longitudinal dimension of the optical fiber, and the spot sizes of the large-diameter core optical fiber and the small-diameter core optical fiber match in the spliced portion.

Further, the relative refractive index difference in the spliced portion of the spot size transition portion is substantially identical with the relative refractive index difference of the large-diameter core optical fiber.

Moreover, the optical fiber component has the large-diameter core optical fiber, the spliced portion, the spot size transition portion, and the small-diameter core optical fiber co-arranged inside a ferrule.

The present invention further provides a method of making an optical fiber component for changing spot sizes of optical fibers with different core diameters, the method of making an optical fiber component for spot size transition comprising: fusion-splicing a large-diameter core optical fiber and a small-diameter core optical fiber to form a spliced portion, heating the vicinity of the spliced portion and thermally diffusing a dopant contained in the small-diameter core optical fiber to thereby expand the core diameter and form a spot size transition portion, and then cutting at an arbitrary position on the large-diameter core optical fiber to provide a cut face as a light incident and outgoing end face, and arranging the large-diameter core optical fiber, the spliced portion, the spot size transition portion, and the small-diameter core optical fiber inside the optical fiber component.

When the dopant is heated and thermally diffused to expand the core diameter of the small-diameter core optical fiber and form the spot size transition portion, the refractive index profile in the spot size transition portion is continuously changed along the longitudinal dimension of the optical fiber, and the vicinity of the spliced portion is heated until spot sizes of the large-diameter core optical fiber and the small-diameter core optical fiber match in the spliced portion.

Further, when the dopant is heated and thermally diffused to expand the core diameter of the small-diameter core optical fiber and form the spot size transition portion, heating is continued until the relative refractive index difference of the spot size transition portion becomes substantially identical to the relative refractive index difference of the large-diameter core optical fiber in the spliced portion.

Moreover, when the dopant is thermally diffused to expand the core diameter of the small-diameter core optical fiber and form the spot size transition portion, heating is performed while transition loss of the spliced portion is monitored.

DESCRIPTION OF THE PREFERRED EMBODIMENT

Figure 1:
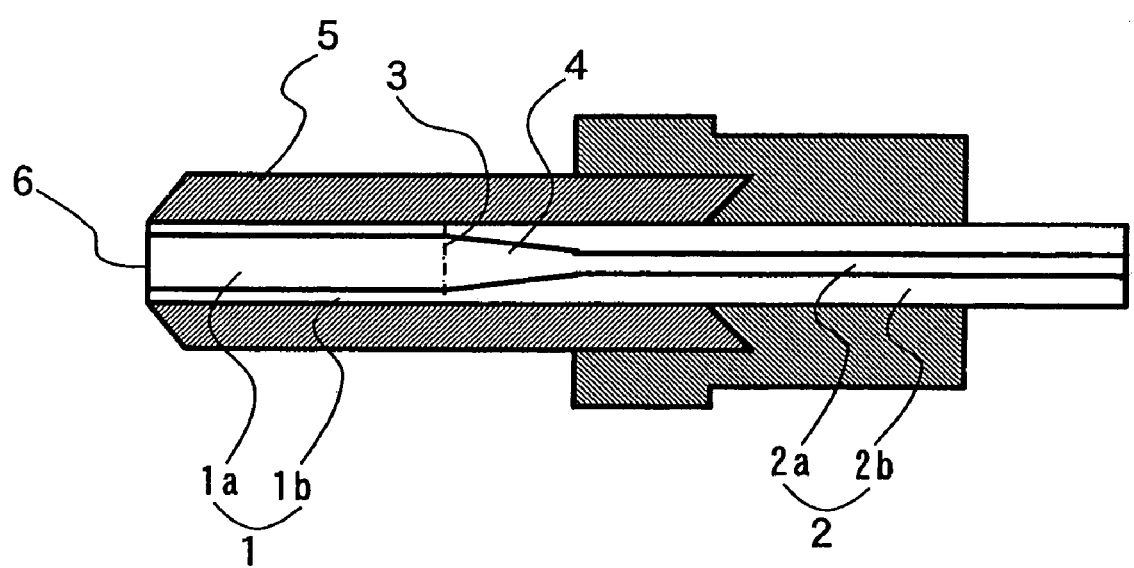
FIG. 1 is a schematic diagram, partially in cross-section, showing an embodiment of the present invention.

An embodiment of the present invention will be hereinafter described with reference to FIG. 1 which is a longitudinal sectional view of an optical fiber component for spot size transition of the present invention. In FIG. 1, a large-diameter core optical fiber 1 comprises a core 1a and a cladding 1b. The core 1a is doped with Ge which is a dopant for increasing the refractive index, and the cladding is pure quartz. This optical fiber 1 is the same as the single mode fiber used in an ordinary communication network, and the relative refractive index difference thereof is 0.3%.

On the other hand, a small-diameter core high Δ optical fiber 2 comprises a core 2a and a cladding 2b. The core 2a is also doped with Ge, and the cladding is also pure quartz. The amount of Ge doped in the core 2a is larger than the amount of Ge doped in the core 1a of the optical fiber 1.

Thus, the high Δ optical fiber 2 is an optical fiber highly resistant against bending. The high Δ optical fiber 2 is also a single mode fiber, and its relative refractive index difference is 0.5 to 2.5%. The degree of the relative refractive index difference of the high Δ optical fiber 2 depends upon a place where it is implemented. Thus, it is sufficient to select a most suitable relative refractive index difference according to a laying environment thereof.

The optical fiber 1 and the high Δ optical fiber 2 are fusion-spliced in spliced portion 3. Then, the core diameter of the high Δ optical fiber 2 in the vicinity of this spliced portion 3 is expanded to form a spot size transition portion 4. The spot size transition portion 4 is a portion in which the vicinity of the spliced portion 3 has been heated to diffuse Ge doped in the core 2a of the high Δ optical fiber 2 into the cladding 2b to expand the core diameter of the core 2a. The refractive index profile continuously changes along the longitudinal dimension of the high Δ optical fiber 2 in the spot size transition portion 4. In addition, the relative refractive index differences of the optical fiber 1 and the high Δ optical fiber 2 are substantially identical in the spliced portion 3. With such a component, increase in transition loss due to mismatching of spot sizes between the optical fiber 1 and the high Δ optical fiber 2 is eliminated.

Further, both the spliced portion 3 and the spot size transition portion 4 are located inside a ferrule 5. The large-diameter core optical fiber 1 is arranged on a light incident and outgoing side in the ferrule 5, and a light incident and outgoing end face 6 is formed. Since the optical fiber 1 has a relative refractive index difference identical with that of an optical fiber used in the ordinary communication network, increase in a transition loss is never caused even if, for example, the optical fiber 1 is spliced with the optical fiber used in a communication network in the part of the light incident and outgoing end face 6. In this embodiment, the core of the optical fiber is doped with Ge, which is a dopant for increasing refractive index, as an example. However, the dopant is not limited to Ge, and other dopants may be adopted. Alternatively, a dopant which decreases refractive index, F for example, may be doped into the cladding.

A method for making an optical fiber component for spot size transition, in accordance with the present invention will now be described with reference to FIGS. 2A to 2C wherein features identical with those described in FIG. 1 are denoted by identical reference numerals. In FIG. 2A, the optical fiber 1 is a single mode fiber, as used in an ordinary communication network, with a relative refractive index difference of 0.3%, in which the core 1a is doped with Ge and the cladding 1b is a pure quartz. In addition, the high Δ optical fiber 2 is also a single mode fiber with a relative refractive index difference of 0.5 to 2.5%, in which the core 2a is doped with Ge and the cladding 2b is a pure quartz. The optical fiber 1 and the high Δ optical fiber 2 are fusion-spliced with end faces thereof abutted against each other.

Note that external diameters of the optical fiber 1 and the high Δ optical fiber 2 may be identical or may be different. In this embodiment, the splice of optical fibers with an identical external diameter is described. However, for example, one of the optical fibers may be a conventional optical fiber with an external diameter of 125 μm and the other may be S-Tylus (registered trademark of Showa Electric Wire & Cable Co., Ltd.) in which an optical fiber with an external diameter of 115 μm is covered with non-releasable resin.

When the optical fiber 1 and the high Δ optical fiber 2 are fusion-spliced, the external diameters thereof are identical in the spliced portion 3. However, the core diameters thereof are different from each other. Actually, the core diameter 2a of the high Δ optical fiber 2 is slightly expanded by heat at the time of fusion-splicing, which is insufficient to achieve the object of the present invention. The length L of a spot side transition portion required for the present invention is 1 to 2 mm when, for example, the ratio γ of the core diameter of a large-diameter core optical fiber to the core diameter of the small-diameter core optical fiber is assumed to be 2, e.g., in the case in which the diameters are 10 μm and 5 μm, respectively.

Figure 2:
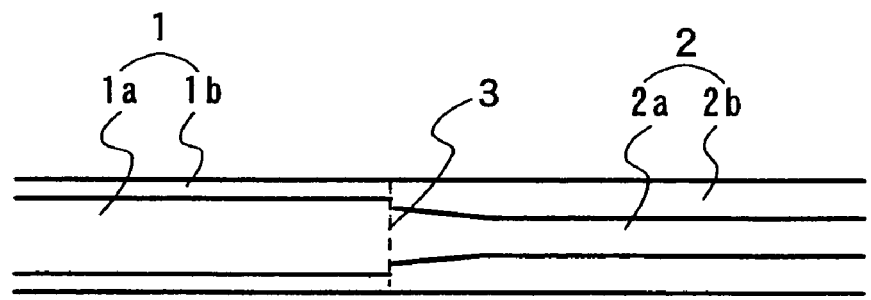
FIGS. 2A to 2C are diagrams illustrating steps in an embodiment of the method of making an optical fiber component of the present invention.
Figure 2:
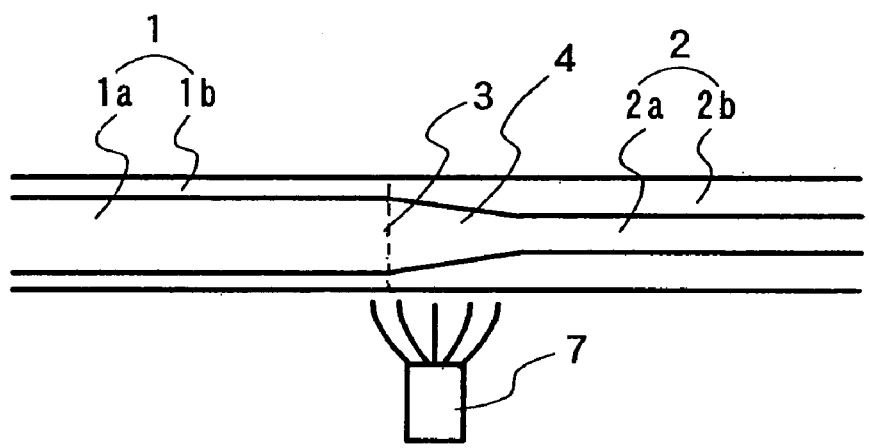
Figure 2:
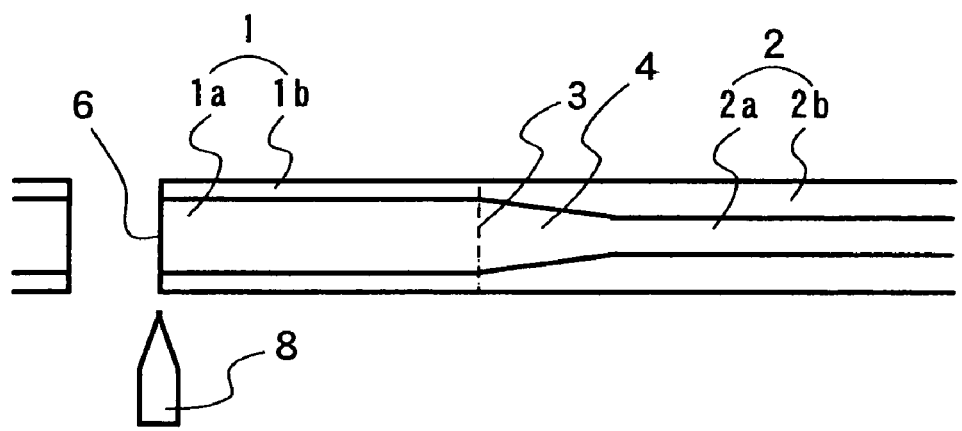

In FIG. 2 after fusion-splicing the optical fiber 1 and the high Δ optical fiber 2, the vicinity of the spliced portion 3 is heated by heating means 7 such as a burner, a heater, or electric discharge. The area to be heated is about several millimeters. Conditions such as heating range, heating time, and heating temperature are appropriately set according to the size of a core diameter to be expanded. At this point, it is preferable to continuously change the refractive index profile in the spot size transition portion 4 in the longitudinal direction of the high Δ optical fiber 2, and to heat the spliced portion 3 until spot sizes of the optical fiber 1 and the high Δ optical fiber 2 match in the spliced portion 3. In addition, it is advisable to expand the core 2a of the high Δ optical fiber 2 until the relative refractive index differences of the optical fiber 1 and the high Δ optical fiber 2 become substantially identical, to form the spot size transition portion 4. In order to make the spot sizes of the optical fiber 1 and the high Δ optical fiber 2 match or the relative refractive index differences of the optical fiber 1 and the high Δ optical fiber 2 substantially identical, it is advisably to continuously monitor transition loss in the spliced portion 3 during heating and to stop the heating at the point when the transition loss of the spliced portion 3 is minimized. Note that in the case of the above-mentioned S-Tylus, since the external diameter thereof is smaller than that of the conventional optical fiber, thermal conductivity is increased, the effect of expansion of core diameter is improved, and working efficiency is improved.

Figure 3:
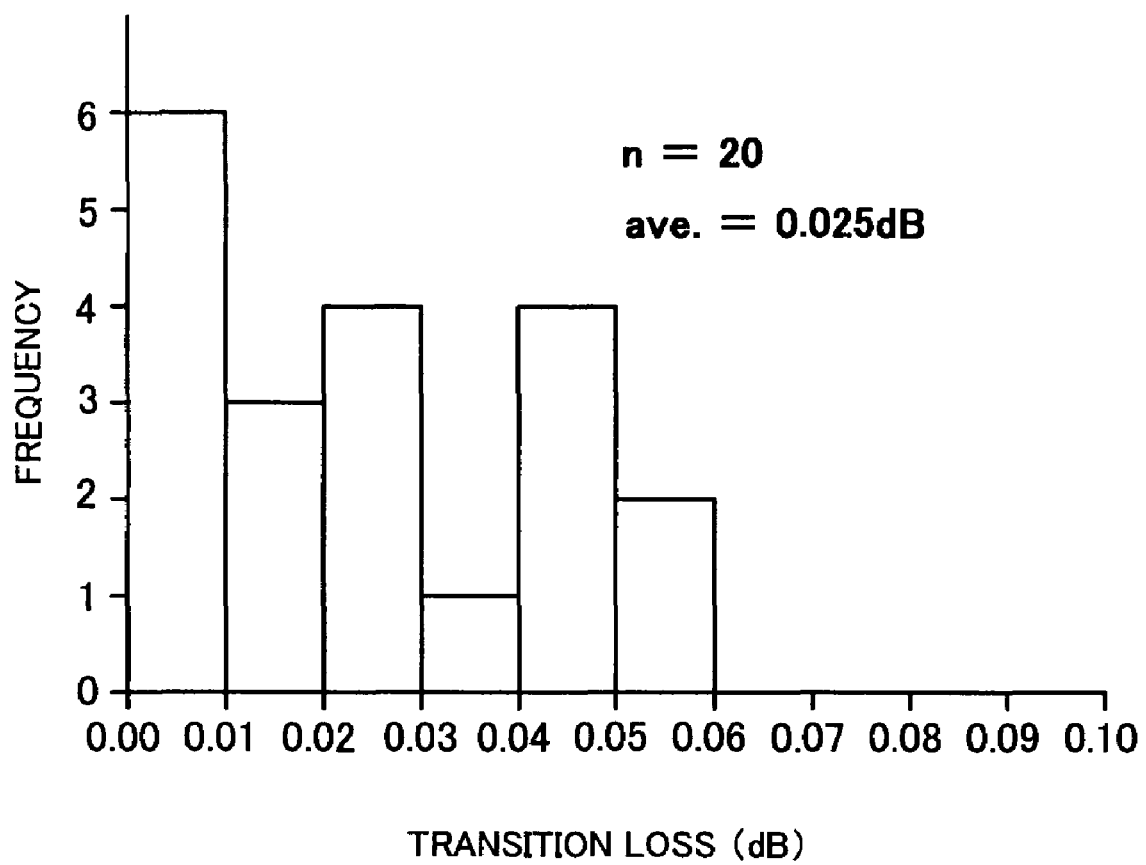
FIG. 3 is a graph of transition loss versus frequency for an optical fiber component of the present invention.

Then, as shown in FIG. 2C, an arbitrary position of the optical fiber 1 is cut by a cutting blade 8 to form a light incident and outgoing end face 6. It is sufficient to cut the optical fiber 1 to an appropriate length such that both the spliced portion 3 and the spot size transition portion 4 can be arranged in a ferrule. Thereafter, all of the optical fiber 1, the spliced portion 3, the spot size transition portion 4, and the high Δ optical fiber 2 are arranged inside the ferrule 5 shown in FIG. 1, and then the light incident and outgoing end face 6 is ground to form the optical fiber component of the present invention. This optical fiber component is mounted to, for example, a not-shown optical connector and used for connecting, by splicing or the like, an ordinary optical fiber and a high Δ optical fiber. FIG. 3 shows the result of measuring a transition loss of the spliced portion 3. The result indicates a transition loss during heating of the spliced portion 3 in expanding core diameter, and the heating is stopped at the point in time when the transition loss reaches a minimum. The heating temperature was 1400° C., and a heating time is several minutes to several tens minutes, although the heating time fluctuates slightly because it is continued until the transition loss reaches a minimum. FIG. 3 shows an average value for the transition loss of 0.025 dB, and a maximum value of 0.06 dB, which are extremely low as compared with a transition loss due to previous mismatching of spot sizes.

In other words, the present invention attempts to solve the problems encountered when a core diameter of a high Δ optical fiber was expanded, and the expanded portion was then cut to fusion-splice or connector-splice the high Δ optical fiber with a SM fiber used in a communication network, i.e., the portion where the expanded portion of the core diameter was cut and therefore transition loss vary, and a highly accurate cutting technique or grinding technique was required. In the solution to the foregoing problem, i.e., the present invention, first, the ordinary optical fiber and the high Δ optical fiber with different core diameters are fusion-spliced, then the core diameter of the small-diameter core high Δ optical fiber is expanded to form an appropriate spot size transition portion, and then a cut is made at an arbitrary position on the large-diameter core optical fiber is cut to constitute an optical fiber component. The large-diameter core optical fiber used in the optical fiber component of the present invention has a core diameter identical with that of the optical fiber used in a communication network, and this core diameter is uniform along its length. Thus, an advanced technique is not required for deciding the location where the cut is to be made. The large-diameter core optical fiber is arranged on the light incident and outgoing end face side. Thus, since optical fibers of the same type as the optical fiber used in a communication network are spliced, for example, even in the case in which the SM optical fiber and the high Δ optical fiber are spliced by an optical connector or the like, increase in transition loss is minimized, and an optical fiber component with stable characteristics is obtained.

According to the optical fiber component for spot size transition and the method of making the same of the present invention as described above, an optical fiber component having an appropriate spot size transition portion can be manufactured without requiring an advanced technique. In addition, an optical fiber component, which does not increase transition loss, even in the case in which a high Δ optical fiber is spliced with a SM optical fiber used in a communication network, can be provided.

What is claimed is:

1. An optical fiber component for spot size transition comprising, arranged inside a ferrule:
    a small-diameter core, single mode optical fiber;
    a large-diameter core, single mode optical fiber having a core with a diameter larger than the diameter of the core of the small-diameter core optical fiber and equal to the diameter of a core of a single mode optical fiber used in an optical fiber communication network;
    a spliced portion in which the large-diameter core optical fiber and the small-diameter optical fiber are fusion-spliced; and
    a spot size transition portion in which the core diameter of the small-diameter core optical fiber is expanded in the vicinity of the spliced portion by heating to thermally diffuse a dopant contained in the core of the small-diameter core optical fiber.

2. An optical fiber component for spot size transition according to claim 1, wherein a refractive index profile in the spot size transition portion continuously changes in the longitudinal direction of the optical fiber, and the spot sizes of the large-diameter core optical fiber and the small-diameter core optical fiber match in the spliced potion.

3. An optical fiber component for spot size transition according to claim 1 wherein said spliced portion has a relative refractive index difference substantially identical to a relative refractive index difference of the large-diameter core optical fiber.

4. An optical fiber component for spot size transition according to claim 1 wherein said small-diameter core optical fiber and said large-diameter core optical fiber have the same external diameter.

5. The optical fiber component for spot size transition according to claim 1 wherein at least one of said fibers has an external diameter of 125 microns.

6. A method of making an optical fiber component for spot transition between single mode optical fibers with different core diameters, comprising:

fusion-splicing a large-diameter core optical fiber and a small-diameter core optical fiber to form a spliced portion;

heating the small-diameter core optical fiber in the vicinity of the spliced portion to thermally diffuse a dopant contained in the core of the small-diameter core optical fiber and expand the core diameter of the small-diameter core optical fiber to form a spot size transition portion;

cutting the large-diameter core optical fiber at an arbitrary position to form a cut face as a light incident and outgoing end face; and then arranging the large-diameter core optical fiber, the spliced portion, the spot size transition portion, and the small-diameter core optical fiber inside a ferrule.

7. A method of making an optical fiber component for spot size transition according to claim 6, wherein said heating produces a refractive index profile in the spot size transition portion which continuously changes along the longitudinal dimension of the optical fiber; and wherein said heating is continued until spot sizes of the large-diameter core optical fiber and the small-diameter core optical fiber match in the spliced portion.

8. A method of making an optical fiber component for spot size transition according to claim 7, wherein said heating is continued until the relative refractive index difference of the spot size transition portion becomes substantially identical to the relative refractive index difference of the large-diameter core optical fiber in the spliced portion.

9. A method of making an optical fiber component for spot size transition according to claim 6 further comprising:

monitoring transition loss in the spliced portion while conducting said heating.

10. A method of making an optical fiber component for spot size transition according to claim 9 wherein said heating is discontinued at the point when the monitored transition loss of the spliced portion is minimized.

11. A method of making an optical fiber component for spot size transition according to claim 6 further comprising:

splicing the light incident and outgoing end face of said large-diameter optical fiber to optical fiber in a communication network.

12. A method of making an optical fiber component for spot size transition according to claim 6 wherein the outer diameter of the small-diameter core optical fiber is not changed by said heating.

* * * * *

UNITED STATES PATENT AND TRADEMARK OFFICE
CERTIFICATE OF CORRECTION

| | | |
|---|---|---|
| PATENT NO. | : 7,037,004 B2 | Page 1 of 1 |
| APPLICATION NO. | : 10/718645 | |
| DATED | : May 2, 2006 | |
| INVENTOR(S) | : Nahoko Nakamura et al. | |

It is certified that error appears in the above-identified patent and that said Letters Patent is hereby corrected as shown below:

On the Title Page #56, under the headings "References Cited" "U.S. PATENT DOCUMENTS", the eighth listed document, "2003/0194485" should read -- 2003/0194185 --.

Signed and Sealed this

Twenty-eighth Day of November, 2006

JON W. DUDAS
*Director of the United States Patent and Trademark Office*